United States Patent [19]
Chadwick, Jr.

[11] 3,844,536
[45] Oct. 29, 1974

[54] GROUNDING DEVICE FOR MULTI-CONDUCTOR STRINGING BLOCKS

[75] Inventor: William H. Chadwick, Jr., Rossville, Ga.

[73] Assignee: Sherman & Reilly, Inc., Chattanooga, Tenn.

[22] Filed: Aug. 1, 1973

[21] Appl. No.: 384,406

[52] U.S. Cl......... 254/134.3 PA, 174/5 SG, 254/192
[51] Int. Cl........................................... B65h 59/22
[58] Field of Search............ 254/134.3 PA, 134.3 R, 254/192; 174/5–7

[56] References Cited
UNITED STATES PATENTS

| | | | |
|---|---|---|---|
| 2,786,092 | 3/1957 | Gage | 254/134.3 PA |
| 3,545,724 | 12/1970 | Wright | 254/134.3 PA |
| 3,565,401 | 2/1971 | Green | 254/134.3 PA |
| 3,720,399 | 3/1973 | Bozeman | 254/134.3 PA |

*Primary Examiner*—Al Lawrence Smith
*Assistant Examiner*—Robert C. Watson
*Attorney, Agent, or Firm*—Davis, McCaleb & Lucas

[57] ABSTRACT

Grounding device for a bundle stringing block having a plurality of coaxial sheaves supported on a laterally extending shaft by a frame, one sheave accommodating a pulling line with the remaining sheaves accommodating individual conductors and at least two of which are disposed on the same side of the pulling line sheave, comprising a metal grounding roller spaced from the periphery and aligned with each sheave, a laterally extending roller shaft rotatably supporting the grounding rollers, an arm articulately connected with each end of the roller shaft and pivoted on the frame coaxially with the sheaves, springs interconnected between each arm and the frame to maintain a substantially constant lifting force on the associated arm, and eccentric bearing means interposed between the roller shaft and two of the adjacent conductor rollers comprising a sleeve having a bore mounted on the roller shaft and two diametrically opposed and laterally spaced cylindrical portions eccentric to the axis of the bore and respectively rotatably supporting those two conductor rollers.

5 Claims, 4 Drawing Figures

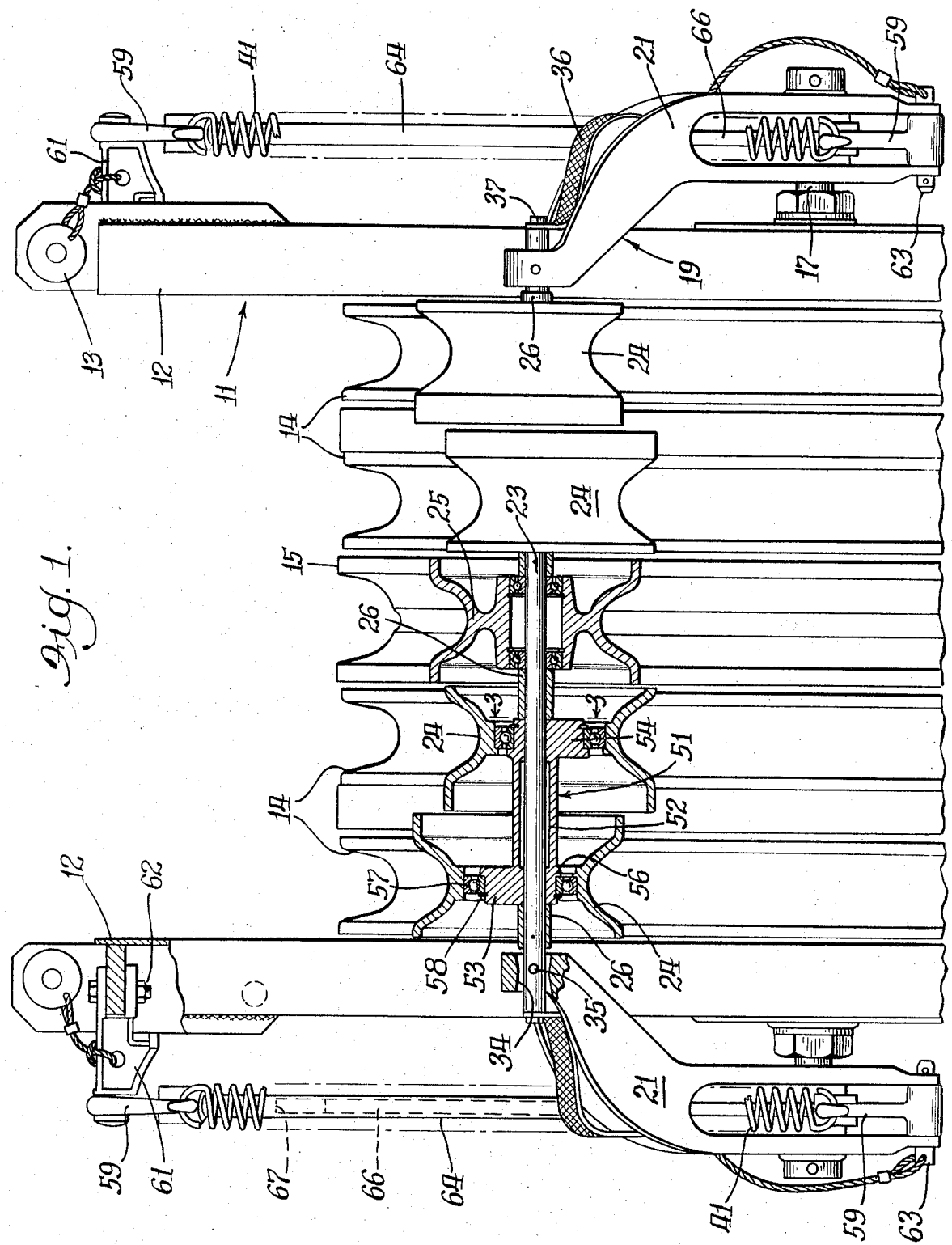

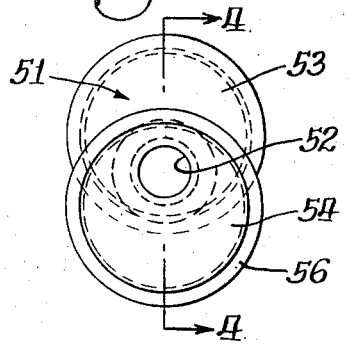
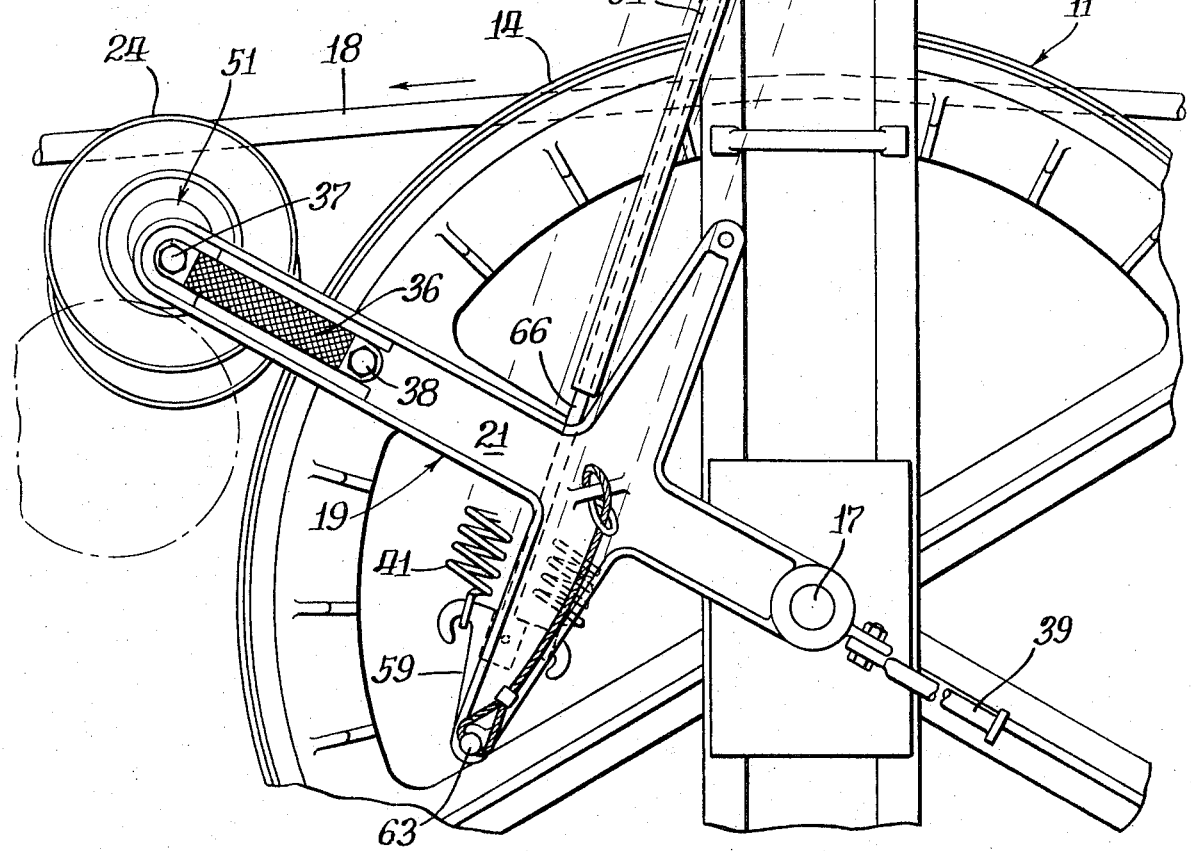
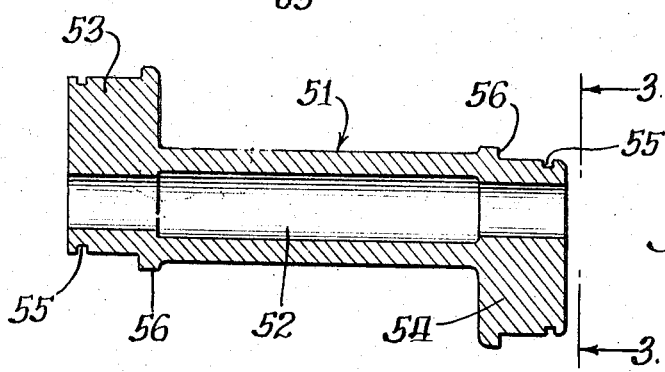

GROUNDING DEVICE FOR MULTI-CONDUCTOR STRINGING BLOCKS

BACKGROUND OF THE INVENTION

1. Field of the Invention

This invention relates in general to stringing equipment for electrical conductors, and more particularly to a device for grounding the conductors and pulling line during bundle conductor stringing operations.

2. Description of the Prior Art

As explained in U.S. Pat. No. 3,720,399, it has been the practice to ground the frames of blocks employed in stringing electrical conductors. While satisfactory with respect to static voltage, that is not effective with respect to the very much higher voltages induced in the conductors being strung in relatively close proximity to existing high voltage lines. That patent discloses a grounding device for a bundle stringing block having a central sheave for accommodating the pulling line and coaxial sheaves disposed outwardly thereof, one on each side, for individually cooperating with two conductors being strung simultaneously. Since different tensioning of the individual conductors normally is present, the resulting angle of tangency of each conductor with its sheave is variable to the point of causing poor contact or disconnection of either of them from its grounding roller. To avoid such results, the grounding device of U.S. Pat. No. 3,720,399 employs articulated connections between the roller shaft and its supporting arms. However, this alone does not solve the problem of varying tensions in individual conductors during stringing of three or more conductors simultaneously.

SUMMARY OF THE INVENTION

The present invention overcomes the indicated problems resulting from variations in tension in the individual conductors resulting in variations in their angles of tangency with their respective sheaves during a stringing operation simultaneously pulling three or more conductors by incorporating eccentric bearing means between the roller shaft and at least one of the conductor sheave grounding rollers. Specifically, the preferred such eccentric bearing means comprises a sleeve having a bore mounted on the roller shaft and two diametrically opposed and laterally spaced cylindrical portions eccentric to the axis of the bore and respectively rotatably supporting adjacent grounding rollers.

In the drawings:

FIG. 1 is a vertical elevational view of the upper part of a bundle block embodying the invention, as seen from its trailing or rear side, with parts in vertical section in a laterally extending plane;

FIG. 2 is an end view as seen from the right side of FIG. 1;

FIG. 3 is an end view of the eccentric bearing means, as seen substantially from the lines 3—3 in FIGS. 1 and 4; and FIG. 4 is a detail longitudinal section through the eccentric bearing means taken on line 4—4 of FIG. 3.

DESCRIPTION OF THE PREFERRED EMBODIMENT

Referring more particularly to the drawings, a bundle conductor stringing block of well known construction is illustrated therein and designated generally by reference numeral 11. The block 11 comprises a rigid frame structure 12 adapted to be suspended in a manner well understood in the art, as by means of suspension fittings 13, by or from the lower end of an insulator string. The block herein illustrated is designed for the simultaneous stringing of four individual conductors, so it includes two separate conductor sheaves or pulleys 14 (FIG. 1) coaxial with and on each side of a center sheave 15 rotatably supported by a laterally extending shaft 17 carried by the frame 12. As is well understood in the art, to effect stringing of four conductors, such as the one shown at 18 in FIG. 2, a pulling line first is drawn through the block 11 over the central sheave 15 in a direction from right to left in FIG. 2 and a runningboard attached to the trailing end of the pulling line is drawn thereby through the block to present the individual conductors 18 to their respective sheaves 14, those conductors being attached in a well known manner to the trailing end of the runningboard. Thereafter, and until the conductors subsequently are connected permanently to the temporarily block-supporting insulator string, those conductors 18 are engaged and supported by the peripheral grooved portions of their associated sheaves 14.

The bundle block 11 incorporates a grounding device which is designated generally by reference numeral 19 and comprises a pair of arms 21 disposed laterally adjacent and outside of the frame 12 which are pivotally supported at their lower ends by the frame. This preferably is accomplished by rotatably mounting the arms 21 on lateral extensions of the shaft 17 adjacent its outer end. Each of these arms 21 is articulately connected to a laterally extending roller shaft 23 for rotatably supporting a metal grounding roller 24 aligned with each of the conductor sheaves 14, a central metal grounding roller 25 aligned with the pulling line sheave 15, and spacer sleeves 26 disposed between adjacent rollers 24 and 25 and outside of the outer rollers 24.

The articulated connections between the roller shaft 23 and its supporting arms 21 are shown in FIG. 1 as comprising a bore 34 in the outer end portions of each of the arms 21 for relatively loosely receiving shaft 23 and a pin 35 extending through the shaft and the associated arm 21 at right angles to the longitudinal axes of the shaft and the arm. The outer ends of each of these bores 34 are enlarged to facilitate pivotal movements of the shaft 23 relative to the associated arm 21 about the axis of the pin 35. At least one of the ends of the roller shaft 23 is electrically connected to its associated arm 21 by a cable 36 secured at one end to the shaft by a bolt 37 and similarly connected by a bolt 38, as shown in FIG. 2, to the associated arm 21. At its lower end, the arm 21 is provided with a grounding bolt 39 for connection to a grounding wire in well known manner.

Means are provided for resiliently interconnecting the frame 12 and each of the arms 21 to impose a predetermined lifting force on the latter which comprises, in the present embodiment, a pair of springs 41. The mechanism so far described herein is substantially the same as that disclosed in U.S. Pat. No. 3,720,399, with the same reference numerals being used here as in that patent. As explained in the latter, the articulated connections 34, 35 between the arms 21 and the roller shaft 23, together with the springs 41, accommodate the two outside conductors to effectively maintain metal-to-metal contact between the pulling line and the central grounding roller 25 before the runningboard reaches the bundle block 11 and, thereafter, between the outside conductors 18 being strung and their associated grounding rollers 24, regardless of the variations of tensions of those conductors relative to each other. Differences in tensioning of those conductors during stringing would have the effect of swinging roller shaft 23 downwardly peripherally of the sheaves 14 in response to a slacking of one of the outside conductors 18 being strung to depress the associated grounding roller 24 against the upward constraining forces of the spring or resilient means 41. It the shaft 23 were rigidly connected to the arms 21, this would result in similar lowering of the other conductor rollers to impair or terminate their conductive contact with the associated conductors. The primary articulation provided by connections 34, 35 between the arms 21 and the shaft 23 prevents such contact-impairing result with respect to the other outside conductor because they permit tilting of the shaft 23 relative to the arms 21, whereby depression of one of the grounding rollers 25 will not automatically be accompanied by a similar depression of the other outside roller 24. However, such primary articulation is insufficient to insure the necessary metal-to-metal contact between each conductor and its associated grounding roller where more than two conductors are being strung simultaneously.

To obviate the disadvantages of that prior device in this respect, the present invention provides eccentric bearing means, indicated generally by reference numeral 51, interposed between the roller shaft 23 and each adjacent pair of grounding rollers 24. This eccentric bearing means 51 is best illustrated in FIGS. 3 and 4 and comprises a sleeve having a bore 52 with reduced end portions rotatably mounted on the shaft 23 and two diametrically opposed and laterally spaced cylindrical portions 53 and 54 eccentric to the axis of the bore 52, one at each end of the sleeve, for rotatably supporting one of the grounding rollers 24, as illustrated in section in FIG. 1. As shown in FIG. 4, each of these eccentric bearing portions 53, 54 has a peripheral groove 55 adjacent its outer end and a flange 56 at its inner end. The associated grounding roller 24 and its ball bearing race 57 are held against the flange 56 by a snap ring 58 engaging in the groove 55 as illustrated in FIG. 1.

Rather than a single spring 41 as in the grounding device disclosed in U.S. Pat. No. 3,720,399 for each of the arms 21, the present construction employs two such springs 41, and ends of which are engaged with hook-like arms on brackets 59. The upper of each of these brackets 59 is carried by the outer end of a mounting bracket 61, the inner end of which is bifurcated to embrace the adjacent upper horizontal portion of the frame 12, as seen at the left in FIG. 1, and is secured thereto by suitable nut and bolt means 62. The lower spring brackets 59 are somewhat differently constructed than the upper brackets 59 and are rotatably secured to the associated arm 21 by a pin 63. The upper end of a movement-limiting tube 64 is secured in any suitable manner, as by means of a pin 65 shown in FIG. 2, to each of the upper spring brackets 59, and the lower end of a rod 66 is similarly attached to each of the lower spring brackets 59, the tube 64 and rod 66 associated therewith telescopically engaging each other, with the upper end of the rod being adapted to contact the upper end 67 of the bore of the tube 64 to limit upward movement of the associated grounding arm 21 by its springs 41.

As previously explained, with this mounting of the arms 21 the articulated connections 34, 35 between the arms 21 and the roller shaft 23 provide primary articulation for assuring proper electrical contact being maintained between each of the two outside conductors 18 and its associated grounding roller 24 within the varying angles of tangency of those conductors with their sheaves 14 experienced in a normal conductor stringing operation. It will be appreciated that the telescopic tube and rod connections 64, 66 not only guide movements of their arms 21 but also, because of their limiting of upward movements of the arms, enable a predetermined initial tension to be maintained by the springs 41. As the pulling line passes through the bundle block 11 on the central sheave 15, it will engage the center grounding roller 25 to depress the same and the roller shaft 23 and supporting arms 21 against the lifting action of the springs 41 a distance depending upon the tension in the pulling line and its angle of tangency with the sheave 15. After the runningboard has thus been drawn through the bundle block 11 to dispose the several conductors 18 in their respective sheaves 14, each of the conductors will also engage its associated grounding roller 24 of the gounding device 19. Before such engagement of the conductors 18 with the grounding device, the rollers 24 are somewhat out of axial alignment with each other, the position assumed by each pair of those rollers 24 being determined by gravity in balancing the eccentric portions 53, 54 of each of the bearing means 51. Expressed somewhat differently, the diametric plane extending through the points on the eccentric portions 53, 54 most distant from the axis of the bore 52, which is that shown in FIG. 4 and designated by the line 4—4 in FIG. 3, will be horizontal when the conductors 18 are not in contact with their associated grounding rollers 24. If the tensions in each pair of conductors 18 at one side of the center sheave 15 were the same, initial engagement of those conductors with their grounding rollers 24 would result in that roller then spaced peripherally farthest from its sheave 14 first being contacted by its associated conductor and its eccentric supporting portion 53 or 54 depressed about the axis of the roller shaft 23 and the paired roller 24 being correspondingly raised at the opposite side of shaft 23. The position thus assumed by the eccentric bearing means 51 will depend upon the relative tensioning of those paired conductors 18 and will insure proper electrical contact betwn each conductor and its grounding roller regardless of variations in tension and resulting angles of tangency of the conductors with their associated sheaves 14. The same cooperation exists between the other paired grounding rollers 24 and their eccentric bearing means 51. The eccentric bearing means 51 thus provide secondary articulation which, with the primary articulation previously noted, results in complete effective articulation of the grounding device 19 to maintain each of the four conductors 18 in electrical contact with its associated grounding roller 24 within any varying angles of tangency of the conductors with their sheaves 14 that may be experienced in normal conductor stringing operations.

Bundle block stringing of more than two conductors thus will be safe and effective, so far as electrically grounding the conductors is concerned, regardless of the number of such conductors, by combining the above-described primary and secondary articulations. It will be appreciated that if three conductors are being strung, two sheaves 14 may be expected to be disposed on one side of the central pulling line sheave 15, and the secondary articulation or eccentric bearing means 51 will be employed with the grounding rollers 24 associated with those two paired sheaves 14. In other words, so long as more than two conductors are being bundle strung, the stringing blocks will include one or more pairs of conductor sheaves on either or both sides of the pulling line sheave, such as two pairs on each side of center when stringing eight conductors, and the two grounding rollers 24 associated with each pair of conductor sheaves will be mounted on an eccentric bearing 51.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. In a bundle stringing block having a supporting frame, a plurality of coaxial sheaves for respectively supporting one of a plurality of conductors and a laterally centrally disposed pulling line, and laterally extending shaft means rotatably supporting said sheaves on said frame; a grounding device comprising a pair of roller arms rotatably supported by said frame laterally outwardly of said sheaves, a metal grounding roller centrally aligned radially with each of said sheaves, a roller shaft extending laterally of said rollers and supported by said arms for swinging movements peripherally of said sheaves, resilient means interconnecting said frame and each of said arms to impose a predetermined lifting force on the latter, and eccentric bearing means interposed between said roller shaft and at least two of said conductor sheave grounding rollers for eccentrically mounting each of said rollers relative to each other and relative to the axis of said roller shaft, whereby said rollers are maintained in electrical contact with their associated conductor or pulling line during a stringing operation regardless of variations in tension and resulting angle of tangency with said sheaves individual to said pulling line and said conductors.

2. A grounding device according to claim 1, wherein said eccentric bearing means comprises a sleeve having a bore mounted on said roller shaft and a cylindrical portion eccentric to the axis of said bore rotatably supporting a said roller.

3. A grounding device according to claim 1, wherein said eccentric bearing means comprises a sleeve having a bore mounted on said roller shaft and two diametrically opposed and laterally spaced cylindrical portions eccentric to the axis of said bore and respectively rotatable supporting a said roller.

4. A grounding device for a bundle block having a frame, a plurality of coaxial sheaves for respectively supporting one of a plurality of conductors and a pulling line during a stringing operation, and laterally extending shaft means rotatably supporting said sheaves on said frame; comprising arm means pivotally supported on said frame, a roller shaft supported by said arm means for swinging movements peripherally of said sheaves, resilient means interconnecting said frame and said arm means to impose a predetermined lifting force on the latter, a metal grounding roller rotatably supported by said roller shaft in centrally aligned radial relationship with each said sheave, and means for insuring electrical contact being maintained between each of said rollers and its associated said conductor or pulling line during a stringing operation regardless of variations in tension and resulting angle of tangency with said sheaves individual to said pulling line and said conductors, comprising articulated interconnections between said roller shaft and said arm means, and eccentric bearing means interposed between said roller shaft and at least two of said conductor sheave grounding rollers for eccentrically mounting each of said rollers relative to each other and relative to the axis of said roller shaft.

5. A grounding device according to claim 4, wherein said sheaves include a pulling line sheave and two conductor sheaves on the same side of said pulling line sheave, and said eccentric bearing means comprises a sleeve having a bore mounted on said roller shaft and two diametrically opposed and laterally spaced cylindrical portions eccentric to the axis of said bore and respectively rotatably supporting one of said two conductor sheaves.

* * * * *